(12) United States Patent  
Kitahara

(10) Patent No.: US 7,564,640 B2
(45) Date of Patent: Jul. 21, 2009

(54) APPARATUS FOR RECORDING OR RETRIEVING DATA ON MAGNETIC TAPE

(75) Inventor: Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/100,935

(22) Filed: Apr. 10, 2008

(65) Prior Publication Data

US 2008/0253017 A1 Oct. 16, 2008

(30) Foreign Application Priority Data

Apr. 13, 2007 (JP) ............................. 2007-105447

(51) Int. Cl.
*G11B 21/04* (2006.01)

(52) U.S. Cl. ...................................................... 360/70

(58) Field of Classification Search .................. 360/70, 360/77.12, 75, 52, 53, 69, 73.02, 73.05, 74.2
See application file for complete search history.

(56) References Cited

U.S. PATENT DOCUMENTS

| | | | | |
|---|---|---|---|---|
| 3,510,857 A | * | 5/1970 | Kennedy et al. | ............... 360/53 |
| 4,497,000 A | * | 1/1985 | Terada et al. | ................... 360/70 |
| 5,047,883 A | * | 9/1991 | Aldrich et al. | ............ 360/271.5 |
| 5,239,432 A | * | 8/1993 | Kuroda | ..................... 360/251.3 |
| 5,323,279 A | * | 6/1994 | Yokomachi et al. | ........ 360/96.2 |
| 5,500,775 A | * | 3/1996 | Fujita et al. | .................... 360/70 |

FOREIGN PATENT DOCUMENTS

JP 6-28635 A 2/1994

* cited by examiner

*Primary Examiner*—Fred Tzeng
(74) *Attorney, Agent, or Firm*—Sughrue Mion, PLLC

(57) ABSTRACT

A magnetic tape drive includes a magnetic head configured to read or write data on a magnetic tape, a transport unit configured to drive the magnetic tape past the magnetic head, a speed detector configured to obtain speed information related to a transport speed of the magnetic tape, a vibrator configured to vibrate the magnetic head, and a controller configured to carry out control over the vibrator based upon the speed information obtained by the speed detector. The controller determines whether the transport speed of the magnetic tape is not lower than a predetermined value, based upon the speed information, starts operation of the vibrator in response to a determination that the transport speed is lower than the predetermined value, and stops the operation of the vibrator in response to a determination that the transport speed is not lower than the predetermined value.

12 Claims, 3 Drawing Sheets

US 7,564,640 B2

APPARATUS FOR RECORDING OR RETRIEVING DATA ON MAGNETIC TAPE

CROSS-REFERENCE TO RELATED APPLICATION(S)

This application claims the foreign priority benefit under Title 35, United States Code, § 119 (a)-(d), of Japanese Patent Application No. 2007-105447, filed on Apr. 13, 2007 in the Japan Patent Office, the disclosure of which is herein incorporated by reference in its entirety.

BACKGROUND OF THE INVENTION

1. Field of the Invention

The present invention relates to an apparatus for recording or retrieving data on a magnetic tape.

2. Description of Related Art

The prevailing apparatus for recording or retrieving data on a magnetic tape (hereinafter referred to simply as "tape"), known in the art, typically includes a magnetic head (hereinafter referred to simply as "head") for recording (writing; encoding) or retrieving (reading; decoding) data on the tape, and a transport unit for driving (moving) the tape past the head. The apparatus of this type is designed to require a tape to run at speeds higher than a predetermined threshold value during the operation of writing or reading data so that an adequate clearance is kept between the tape and the head as if the tape is supported by air bearing. However, during a tape accelerating/decelerating period, e.g., periods of transition between a standstill and a normal running state, the running speeds (transport speeds) of the tape become lower than the speed of the normal tape running period, and thus a sufficient clearance cannot be kept, with the result that the tape and the head are brought into contact with each other and slid with an increased frictional resistance such that the tape would likely stick to the head in some circumstances.

Meanwhile, a technique known in the art (e.g., as disclosed in JP 6-28635 A) has proposed that a head be ultrasonically vibrated all the time in a direction of travel of a tape. In this technique, as disclosed, the object of ultrasonic vibrations of the head is to suppress sticking of magnetic powder to the head; however, the ultrasonic vibrations of the head may be expected to prevent sticking of the tape to the head.

However, the above technique in which the head is ultrasonically vibrated all the time would possibly induce disadvantageous phenomena when adapted to a magnetic tape that is recorded with high recording density, for example, in that: (1) the head could drift out from an appropriate recording or retrieving position ("off track"); (2) that a clearance between the head and the tape would become too wide ("spacing loss").

The present invention has been made in an attempt to eliminate the above disadvantages. Illustrative, non-limiting embodiments of the present invention overcome the above disadvantages and other disadvantages not described above. Also, the present invention is not required to overcome the disadvantages described above, and illustrative, non-limiting embodiments of the present invention may not overcome any of the problems described above.

SUMMARY OF THE INVENTION

It is one aspect of the present invention to provide an apparatus for recording or retrieving data on a magnetic tape, which is adapted to suppress the "off track" and "spacing loss" problems while preventing sticking of a magnetic tape to a magnetic head.

More specifically, in one aspect of the present invention, there is provided an apparatus for recording or retrieving data on a magnetic tape, which comprises: a transport unit configured to run the magnetic tape; a magnetic head configured to read or write data on the magnetic tape; a speed detector configured to obtain speed information related to a transport speed of the magnetic tape; a vibrator configured to vibrate the magnetic head; and a controller configured to determine whether the transport speed of the magnetic tape is not lower than a predetermined value based upon the speed information, to start operation of the vibrator in response to a determination that the transport speed is lower than the predetermined value, and to stop the operation of the vibrator in response to a determination that the transport speed is not lower than the predetermined value. That is, the controller which is configured to carry out control over the vibrator based upon the speed information obtained by the speed detector may comprise: means for determining whether the transport speed of the magnetic tape is not lower than a predetermined value, based upon the speed information; means for starting operation of the vibrator in response to a determination that the transport speed is lower than the predetermined value; and means for stopping the operation of the vibrator in response to a determination that the transport speed is not lower than the predetermined value.

With this configuration, when the transport speed of the magnetic tape is lower than the predetermined value, for example, during the startup or shutdown period of the transport unit, the vibrator is put into operation by the controller to vibrate the magnetic head. This can serve to prevent sticking of the magnetic tape to the magnetic head. When the transport speed of the magnetic tape is not lower than the predetermined value, the vibrator is stopped by the controller to put the magnetic head into a stationary state. This can serve to suppress the "off track" and "spacing loss" problems.

The aforementioned vibrator may comprise means for vibrating the magnetic head in a direction perpendicular to a surface of the magnetic tape. With this additional feature, since the magnetic head is vibrated in the direction perpendicular to the surface of the magnetic tape, the magnetic tape can be prevented more effectively from sticking to the magnetic head.

In the above configurations, with or without the additional feature, the speed detector may comprise: a first detector configured to read data recorded on the magnetic tape; and a second detector configured to measure an amount of operation of the transport unit, whereas the controller may be further configured to calculate the transport speed based upon the data read by the first detector to provide the calculated transport speed for determination as to whether the transport speed of the magnetic tape is not lower than the predetermined value when the vibrator is not in operation, and to calculate the transport speed based upon the amount of operation of the transport unit measured by the second detector to provide the calculated transport speed for determination as to whether the transport speed of the magnetic tape is not lower than the predetermined value when the vibrator is in operation. In other words, the controller may further comprise: means for determining whether or not the vibrator is in operation; means for calculating the transport speed based upon the data read by the first detector to provide the calculated transport speed for determination to be made when the vibrator is not in operation as to whether the transport speed of the magnetic tape is not lower than the predetermined value; and means for calculating the transport speed based upon the amount of operation of the transport unit measured by the second detector to provide the calculated transport speed for determination to be made when the vibrator is in operation as to whether the transport speed of the magnetic tape is not lower than the predetermined value.

With this configuration, the transport speed of the magnetic tape is calculated based upon the data recorded on the magnetic tape when the magnetic head is in a stationary state, and thus the control carried out by the controller is improved through the use of the transport speed calculated with increased accuracy.

In another aspect of the present invention, an apparatus for recording or retrieving data on a magnetic tape is provided, which comprises: a transport unit configured to run the magnetic tape; a magnetic head configured to read or write data on the magnetic tape; a speed detector configured to obtain speed information related to a transport speed of the magnetic tape; a separator configured to separate the magnetic tape and the magnetic head; and a controller configured to determine whether the transport speed of the magnetic tape is not lower than a predetermined value based upon the speed information, to activate the separator to separate the magnetic tape and the magnetic head, in response to a determination that the transport speed is lower than the predetermined value, and to deactivate the separator to restore an initial pre-activated state of the separator in response to a determination that the transport speed is not lower than the predetermined value. The controller which is configured to carry out control over the separator based upon the speed information obtained by the speed detector may comprise: means for determining whether the transport speed of the magnetic tape is not lower than a predetermined value, based upon the speed information; means for activating the separator to separate the magnetic tape and the magnetic head, in response to a determination that the transport speed is lower than the predetermined value; and means for deactivating the separator to restore an initial pre-activated state of the separator, in response to a determination that the transport speed is not lower than the predetermined value.

With this configuration, when the transport speed of the magnetic tape is lower than the predetermined value, for example, during the startup or shutdown period of the transport unit, the separator is put into operation by the controller to separate the magnetic tape and the magnetic head. This can serve to prevent sticking of the magnetic tape to the magnetic head. When the transport speed of the magnetic tape is not lower than the predetermined value, the separator is deactivated by the controller to restore its initial pre-activated state. This resultantly restores the appropriate amount of spacing between the magnetic head and the magnetic tape, thus serving to suppress the "off track" and "spacing loss" problems.

In this configuration, the speed detector may comprise: a first detector configured to read data recorded on the magnetic tape; and a second detector configured to measure an amount of operation of the transport unit, whereas the controller may further be configured to calculate the transport speed based upon the data read by the first detector to provide the calculated transport speed for determination as to whether the transport speed of the magnetic tape is not lower than the predetermined value when the separator is in a deactivated state, and to calculate the transport speed based upon the amount of operation of the transport unit measured by the second detector to provide the calculated transport speed for determination as to whether the transport speed of the magnetic tape is not lower than the predetermined value when the separator is in an activated state. In other words, the controller may further comprise: means for determining whether the separator is in an activated or deactivated state; means for calculating the transport speed based upon the data read by the first detector to provide the calculated transport speed for determination to be made when the separator is in the deactivated state as to whether the transport speed of the magnetic tape is not lower than the predetermined value; and means for calculating the transport speed based upon the amount of operation of the transport unit measured by the second detector to provide the calculated transport speed for determination to be made when the separator is in the activated state as to whether the transport speed of the magnetic tape is not lower than the predetermined value.

With this configuration, the transport speed of the magnetic tape is calculated based upon the data recorded on the magnetic tape when the separator is in the initial (pre-activated or deactivated) state, and thus the control carried out by the controller is improved through the use of the transport speed calculated with increased accuracy.

The aforementioned separator may comprise a blower configured to blow air in a direction from the magnetic head to the magnetic tape. Alternatively, the separator may comprise a mechanism configured to change a position or an angle of a guide roller which guides the magnetic tape. Alternatively, the separator may comprise a mechanism configured to change a position or an angle of the magnetic head.

According to some of the exemplified embodiments of the present invention, the state of the magnetic head may be switched between a vibrating state and a stationary state, or the spacing between the magnetic head and the magnetic tape may be changed in an appropriate manner, so that sticking of the magnetic tape to the magnetic head can be prevented while the "off track" and "spacing loss" problems can be suppressed.

BRIEF DESCRIPTION OF THE DRAWINGS

The above aspects, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

A detailed description will be given of the exemplary embodiments of the present invention with reference to the drawings. In the following description, a magnetic tape drive for recording and retrieving data on a magnetic tape is taken as an example of an apparatus for recording or retrieving data on a magnetic tape according to one exemplary embodiment of the present invention.

Figure 1:
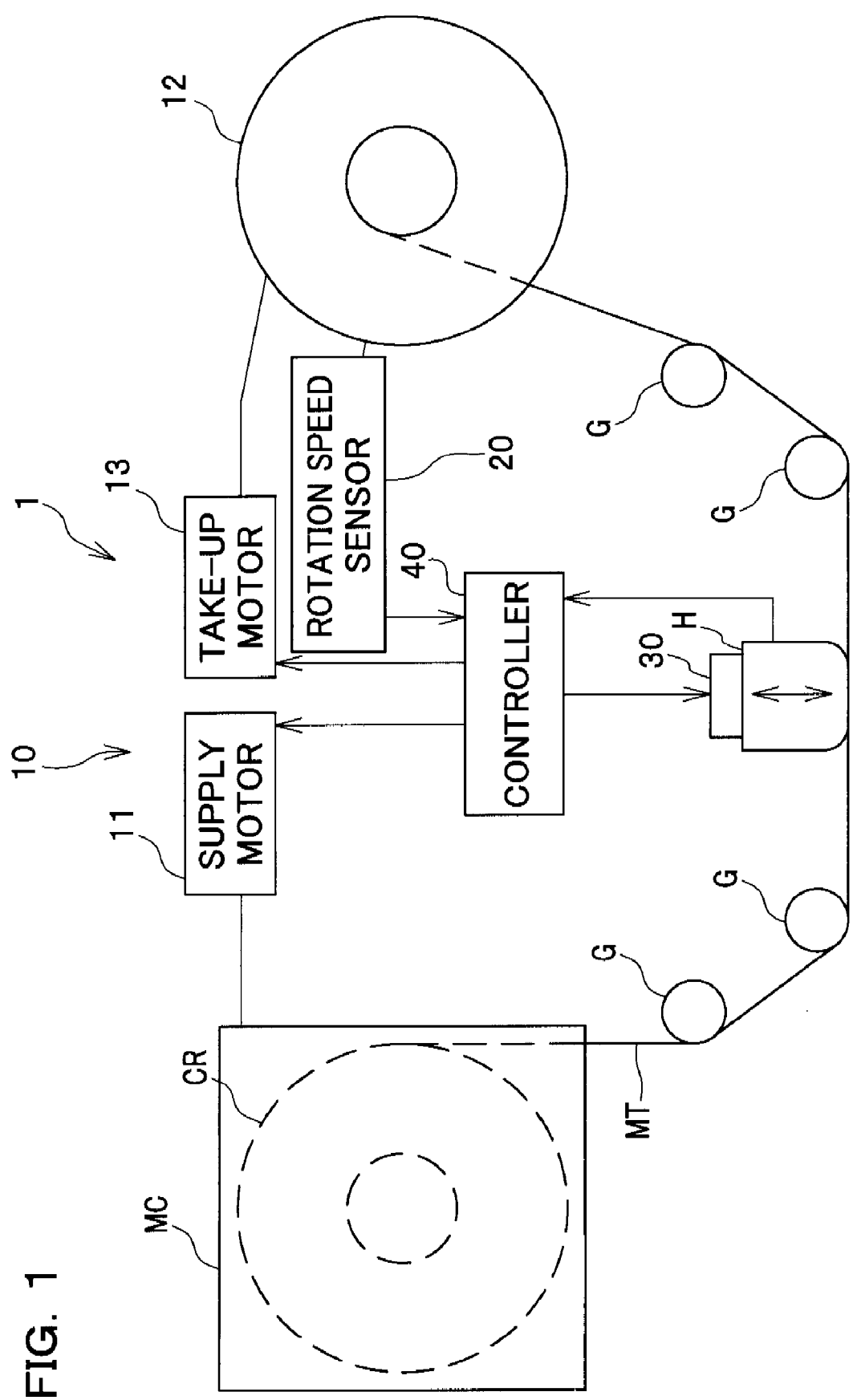
FIG. 1 is a schematic diagram of a magnetic tape drive according to an exemplary embodiment of the present invention.

As shown in FIG. 1, a magnetic tape drive 1, which is configured to draw a magnetic tape MT from a magnetic tape cartridge MC to record and retrieve data on the magnetic tape MT, includes a transport unit 10, a magnetic head H, a rotation speed sensor 20, a vibrator 30 and a controller 40.

The transport unit 10 is a device to drive (move or run) a magnetic tape MT in one direction and in the opposite direction, and principally includes a supply motor 11, a take-up reel 12, a take-up motor 13 and a plurality of guide rollers G.

The supply motor 11 is configured to drive and rotate a cartridge reel CR within the magnetic tape cartridge MC, and its rotation direction, rotation speed, and rotation moment or torque and the like are controlled appropriately by the controller 40. To be more specific, when the magnetic tape MT is being wound on the take-up reel 12 by the take-up motor 13, the controller 40 regulates the rotation speed or torque of the supply motor 11 in accordance with the speed of the magnetic tape MT that is being wound on the take-up reel 12, so that an adequate tension is applied to the magnetic tape MT. When the magnetic tape MT is to be wound (rewound) on the cartridge reel CR, the controller 40 causes the supply motor 11 to rotate in the rewinding direction at a predetermined rotation speed.

The take-up reel 12 is a reel on which the magnetic tape MT supplied from the cartridge reel CR is wound.

The take-up motor 13 is configured to drive and rotate the take-up reel 12, and its rotation direction, rotation speed, and rotation moment or torque and the like are controlled appropriately by the controller 40. To be more specific, when the magnetic tape MT is being rewound on the cartridge reel CR by the supply motor 11, the controller 40 regulates the rotation speed or torque of the take-up motor 13 in accordance with the speed of the magnetic tape MT that is being rewound on the cartridge reel CR, so that an adequate tension is applied to the magnetic tape MT. When the magnetic tape MT is to be wound on the take-up reel 12, the controller 40 causes the take-up motor 13 to rotate in the winding direction at a predetermined rotation speed.

In the present embodiment, the rotation speed and the torque of each of the supply motor 11 and the take-up motor 13 are controlled to regulate the tension of the magnetic tape MT, but the tension may be regulated by any other means, for example, by a dancer roller, or by a vacuum chamber configured to suck the magnetic tape MT so appropriately as to regulate the tension.

The guide rollers G are configured to guide the magnetic tape MT, and are arranged in predetermined positions in the magnetic tape drive 1 to thereby determine the route or path on which the magnetic tape MT is to run.

The magnetic head H has a face to be opposed to the magnetic tape MT, and the face has a dimension which covers the entire width of the magnetic tape MT. The face of the magnetic head H has a known head gap formed therein, though not shown, for writing and reading data, and for reading longitudinal position or LPOS data.

The rotation speed sensor 20 is one example of the speed detector, and configured to obtain the rotation speed of the take-up reel 12, as speed information related to the transport speed of the magnetic tape MT. The rotation speed sensor 20 outputs the obtained rotation speed to the controller 40.

The vibrator 30 is a device configured to vibrate the magnetic head H, and disposed in an appropriate position on the magnetic head H such that the direction of vibration is a direction perpendicular to the surface of the magnetic tape M in the present embodiment. The vibrator 30 may include an ultrasonic transducer or air blower used to vibrate the magnetic head H. The ultrasonic transducer may be of a piezoelectric, electrostrictive or magnetoristrictive material, which is made of a laminated or single-plate ceramic of a lead zirconate tinatate (PZT) or plastic of a polyvinylidene fluoride.

Instead of the vibrator 30, any mechanism for increasing the spacing between the head and the tape may be provided to achieve similar advantageous effects. Examples of such a mechanism may include a separator configured to increase the spacing between the head and the tape, for example, by blowing air from the head or around the head to the tape (in a direction from the head), or by moving or tilting the position of at least one guide roller G, to thereby reduce the sliding friction. That is, the separator may be a blower configured to blow air in a direction from the head to the tape, or a mechanism configured to change a position or an angle of a guide roller G which guides the tape, or a mechanism configured to move the magnetic head away from the magnetic tape and to move the magnetic head back to an original position. The mechanism configured to change a position or an angle of a guide roller G which guides the tape may include, for example, an elastic member configured to bias the guide roller G to the position or angle that permits the head to always record or retrieve data on the tape, and an actuator, such as an air cylinder, configured to move the guide roller G against the biasing force applied by the elastic member. In this instance, the guide roller G may be moved away from the head against the biasing force of the elastic member by operating the actuator, while the guide roller G may be moved back to its original position or angle for recording or retrieving data on the tape by making use of the restoration force of the elastic member.

Figure 2:
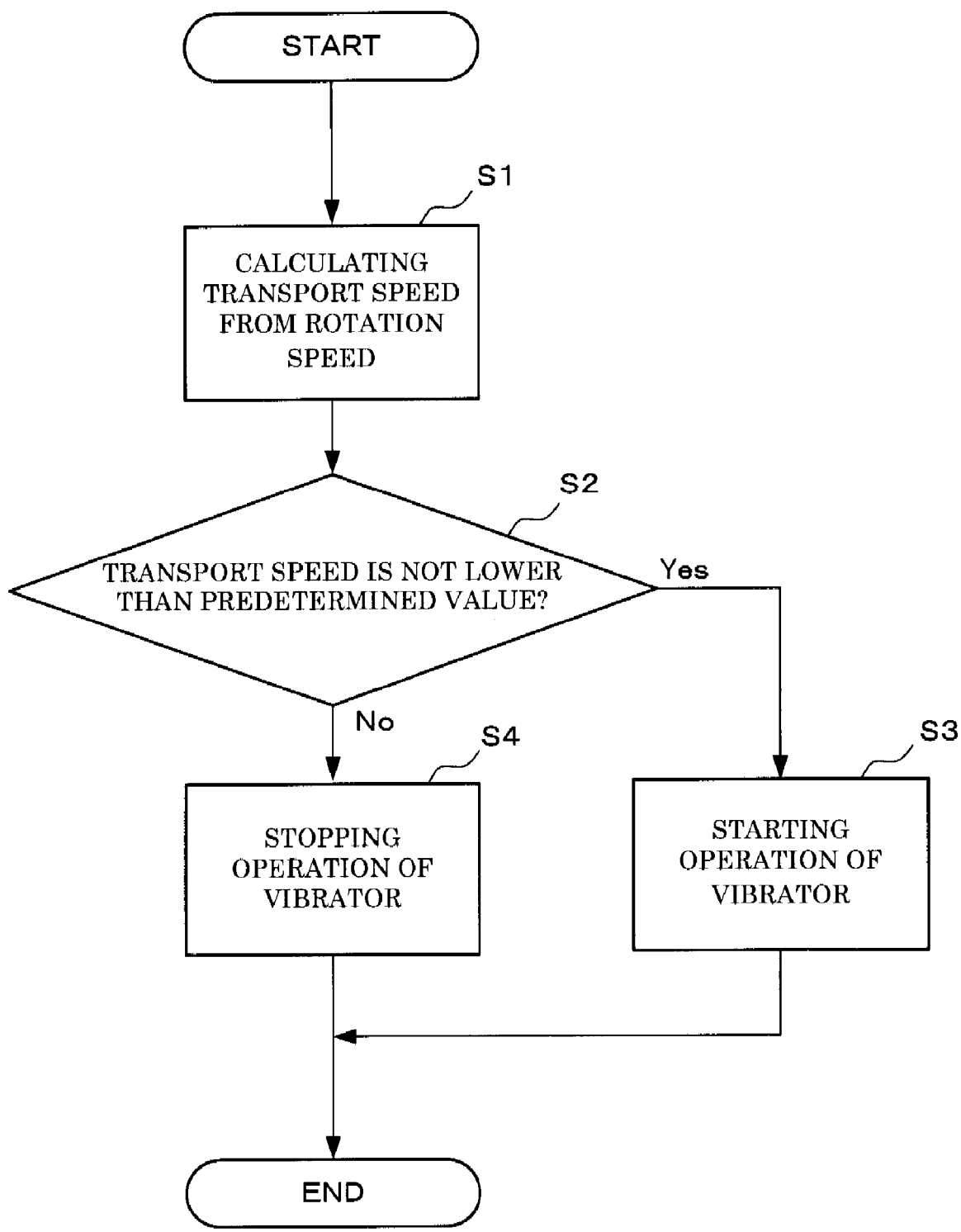
FIG. 2 is a flowchart showing a process of control carried out by a controller.

The controller 40 is configured to control the transport unit 10 as described above, and further configured to control the vibrator 30 based upon the rotation speed obtained by the rotation speed sensor 20. To be more specific, the controller 40 performs the process steps as illustrated in FIG. 2: i.e., calculating the transport speed of the magnetic tape MT based upon the rotation speed obtained by the rotation speed sensor 20 (S1); determining whether the calculated transport speed is not lower than a predetermined value (S2); if it is determined that the transport speed of the magnetic tape MT is lower than the predetermined value (Yes in Step S2), starting operation of the vibrator 30 (S3); and if it is determined that the transport speed of the magnetic tape MT is not lower than the predetermined value (No in Step S2), stopping operation of the vibrator 30 (S4). Hereupon, the 'predetermined value' in step S2 may be set, for example, at 90% or so of the speed to be attained during the writing/reading operation.

Next, described is an operation of the controller 40 from the startup to the shutdown of the transport unit 10.

At the startup of the transport unit 10, where the transport speed of the magnetic tape MT is zero, the controller 40 determines that the transport speed is lower than the predetermined value, and thus starts the operation of the vibrator 30. The operation of the vibrator 30 causes the magnetic head H to vibrate in a direction perpendicular to the surface of the magnetic tape MT, and thus serves to prevent sticking of the magnetic tape MT to the magnetic head H.

Thereafter, when the transport speed is increased to the speed not lower than the predetermined value, the controller 40 stops the operation of the vibrator 30. Since the magnetic head H is then put into a stationary state, the "off track" and "spacing loss" problems may be suppressed, so that the recording or retrieving of data may be performed with increased accuracy.

When the transport unit 10 in operation for recording or retrieving the data is put into the shutdown stage, the transport speed of the magnetic tape MT is gradually decreased, and when the controller 40 determines that the transport speed has become lower than the predetermined value, the controller 40 restart the operation of the vibrator 30. The operation of the vibrator 30 at this stage also causes the magnetic head H to vibrate in a direction perpendicular to the surface of the magnetic tape MT, and thus serves to prevent sticking of the magnetic tape MT to the magnetic head H.

In the exemplary embodiments as described above, the following advantages can be achieved.

The state of the magnetic head H may be switched between a vibrating state and a stationary state, so that the "off track" and "spacing loss" problems which would otherwise arise during the operation of recording or retrieving data may be suppressed, while sticking of the magnetic tape MT to the magnetic head H which would otherwise occur during the low-speed running state of the magnetic tape MT can be prevented. In particular, for a magnetic tape MT having a high recording density, a servo signal can be read out from the magnetic tape MT without fail because the magnetic head H is not vibrated during the data recording or retrieving operation, so that the data recording or retrieving operation can be performed with increased accuracy. Furthermore, it is noted that the magnetic tape MT having a high recording density should also have a high surface smoothness, and thus sticking of the magnetic tape MT to the magnetic head H is more likely to occur when the transport speed of the magnetic tape MT is lower than the normal speed at which the magnetic tape MT runs during the normal operation of recording or retrieving data. However, In the above-described embodiments, sticking of the magnetic tape MT to the magnetic head H can be prevented even during the transport of the magnetic tape MT at lower speeds. The expected increase of linear recording density in the future will require the amount of spacing between the magnetic head H and the magnetic tape MT to be made smaller from the current level on the order of 40-100 nm toward the level on the order of 30 nm or smaller, and the surface roughness of the magnetic tape MT to be made smaller from the current level on the order of 3 nm to the level on the order of 2 nm and further toward the level on the order of 1 nm. Therefore, the importance of the present invention will be increased more and more in the future.

Since the direction in which the magnetic head H is vibrated in this embodiment is in a direction perpendicular to a surface of the magnetic tape MT, sticking of the magnetic tape MT to the magnetic head H can be prevented more effectively.

Some exemplary embodiments of the present invention have been described above. The present invention is not limited to these embodiments, and may be carried out into practice in various other ways. Thus, it is contemplated that various modifications and changes may be made to the exemplary embodiments of the invention without departing from the scope of the embodiments of the present invention as defined in the appended claims.

Although a speed detector as claimed is exemplified by the rotation speed sensor 20 singly provided in the above-described embodiments, the speed detector may comprise two detectors, i.e., a first detector configured to read data recorded on the magnetic tape MT, and a second detector configured to measure an amount of operation of the transport unit 10. For example, the first detector may be the magnetic head H which is configured to read longitudinal position or LPOS data recorded on the magnetic tape MT, while the second detector may be the rotation speed sensor 20. In this alternative embodiment, the controller 40 may be configured such that the transport speed is calculated based upon the LPOS data read by the magnetic head H when the vibrator 30 is not in operation, and the transport speed is calculated based upon the rotation speed obtained by the rotation speed sensor 20 when the vibrator 30 is in operation.

Figure 3:
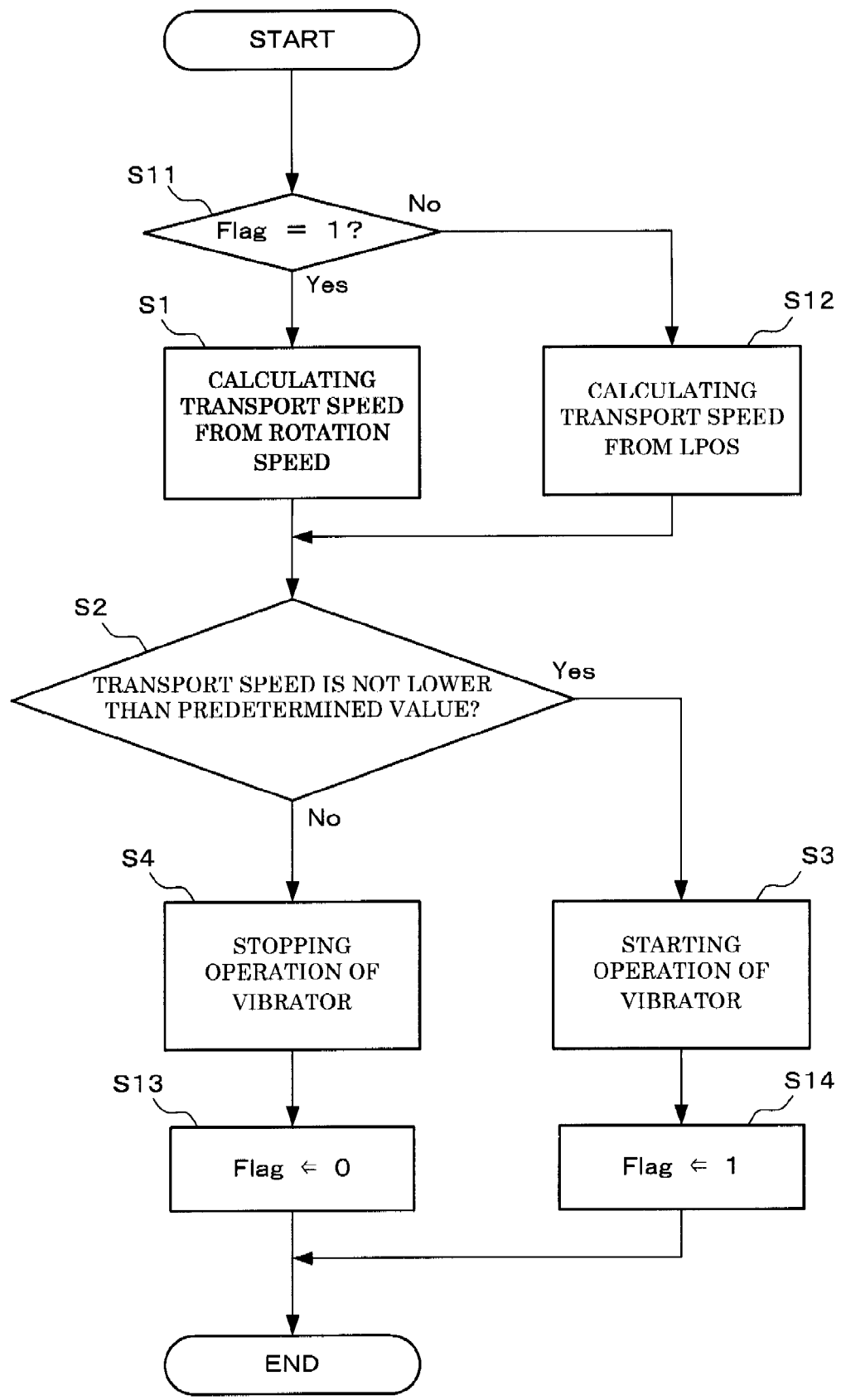
FIG. 3 is a flowchart showing a process of control carried out by a controller according to another exemplary embodiment of the present invention.

The specific process steps of the controller 40 in this embodiment are illustrated in a flowchart of FIG. 3.

Next, a detailed description will be given of the flowchart of FIG. 3. Since steps S1-S4 show the same process as illustrated in the flowchart of FIG. 2, a duplicate description will be omitted.

As shown in FIG. 3, the controller 40 first determines whether or not the vibrator 30 is in operation by determining whether the flag is '1' or not (S11). If the controller 40 determines in step S11 that the vibrator 30 is in operation (Yes), then the controller 40 proceeds to perform step S1 as described above. If the controller 40 determines in step S11 that the vibrator 30 is not in operation (No), then the controller 40 calculates the transport speed from LPOS (S12). To be more specific, in step S12, the transport speed is calculated based upon a time when the magnetic head H reads first LPOS data at a predetermined position, a time when the magnetic head H reads second LPOS data at a position a predetermined distance away from the first LPOS data, and the predetermined distance between the first and second LPOSes.

After step S1 or S12 is performed, the process goes to step S2 as described above. If the controller 40 determines in step S2 that the transport speed is not lower than the predetermined value (No), and stops the operation of the vibrator 30 (S4), then the controller 40 assigns '0' to the flag (S13). If the controller 40 determines in step S2 that the transport speed is lower than the predetermined value (Yes), and starts the operation of the vibrator 30 (S3), then the controller 40 assigns '1' to the flag (S14). After steps S13 and S14, the process in this flowchart comes to an end.

According to the process as described above, the controller calculates the transport speed of the magnetic tape MT based upon the LPOS data recorded on the magnetic tape MT when the vibrator 30 is not operated and the magnetic head H is in a stationary state, and thus can use the transport speed calculated with increased accuracy.

It is to be understood that the first detector configured to read data recorded on the magnetic tape MT as claimed is not limited to the magnetic head H configured to read LPOS data recorded on the magnetic tape MT. For example, a write head for writing data for speed calculation onto a magnetic tape MT, a read head for reading the data from the magnetic tape MT, and an erasing head for erasing the data from the magnetic tape MT may be used in combination to implement the first detector. In this alternative embodiment, the transport speed may be calculated based upon a time when the write head writes data for speed calculation, a time when the read head reads the data, and a distance between the write head and the read head.

In the above-described embodiment, a magnetic tape drive 1 that has a double function of recording and retrieving data on a magnetic tape is adopted as an apparatus for recording or retrieving data on a magnetic tape, but the present invention is not limited thereto. For example, a servo writer dedicated solely to recording of a servo signal, or a drive dedicated solely to the retrieval of data without recording functionality may be adopted, instead.

The head H is vibrated in a direction perpendicular to a surface of a tape in the above embodiments, but the present invention is not limited thereto; the head may be vibrated in a direction parallel to the surface of the tape, instead.

The above embodiments use a rotation speed of a take-up reel 12 as an amount of operation of the transport unit 10, but the present invention is not limited thereto; the rotation speed of a supply motor 1, a take-up motor 13 or a guide roller G, etc. may be used, instead.

The above embodiments are configured to determine whether or not a transport speed calculated from a rotation speed is lower than a predetermined value, but the present invention is not limited thereto. For example, determination as to whether the rotation speed is lower than a predetermined value may be made without calculating the transport speed, so as to indirectly determine whether the transport speed is lower than the predetermined value, based upon the rotation speed.

What is claimed is:

1. An apparatus for recording or retrieving data on a magnetic tape, comprising:
    a transport unit configured to run the magnetic tape;
    a magnetic head configured to read or write data on the magnetic tape;
    a speed detector configured to obtain speed information related to a transport speed of the magnetic tape;
    a vibrator configured to vibrate the magnetic head; and
    a controller configured to determine whether the transport speed of the magnetic tape is not lower than a predetermined value based upon the speed information, to start operation of the vibrator in response to a determination that the transport speed is lower than the predetermined value, and to stop the operation of the vibrator in response to a determination that the transport speed is not lower than the predetermined value.

2. The apparatus according to claim 1, wherein the vibrator vibrates the magnetic head in a direction perpendicular to a surface of the magnetic tape.

3. The apparatus according to claim 2,
    wherein the speed detector comprises:
        a first detector configured to read data recorded on the magnetic tape; and
        a second detector configured to measure an amount of operation of the transport unit, and
    wherein the controller is further configured to calculate the transport speed based upon the data read by the first detector to provide the calculated transport speed for determination as to whether the transport speed of the magnetic tape is not lower than the predetermined value when the vibrator is not in operation, and to calculate the transport speed based upon the amount of operation of the transport unit measured by the second detector to provide the calculated transport speed for determination as to whether the transport speed of the magnetic tape is not lower than the predetermined value when the vibrator is in operation.

4. The apparatus according to claim 1,
    wherein the speed detector comprises:
        a first detector configured to read data recorded on the magnetic tape; and
        a second detector configured to measure an amount of operation of the transport unit, and
    wherein the controller is further configured to calculate the transport speed based upon the data read by the first detector to provide the calculated transport speed for determination as to whether the transport speed of the magnetic tape is not lower than the predetermined value when the vibrator is not in operation, and to calculate the transport speed based upon the amount of operation of the transport unit measured by the second detector to provide the calculated transport speed for determination as to whether the transport speed of the magnetic tape is not lower than the predetermined value when the vibrator is in operation.

5. An apparatus for recording or retrieving data on a magnetic tape, comprising:
    a transport unit configured to run the magnetic tape;
    a magnetic head configured to read or write data on the magnetic tape;
    a speed detector configured to obtain speed information related to a transport speed of the magnetic tape;
    a separator configured to separate the magnetic tape and the magnetic head; and
    a controller configured to determine whether the transport speed of the magnetic tape is not lower than a predetermined value based upon the speed information, to activate the separator to separate the magnetic tape and the magnetic head, in response to a determination that the transport speed is lower than the predetermined value, and to deactivate the separator to restore an initial pre-activated state of the separator in response to a determination that the transport speed is not lower than the predetermined value.

6. The apparatus according to claim 5,
    wherein the speed detector comprises:
        a first detector configured to read data recorded on the magnetic tape; and
        a second detector configured to measure an amount of operation of the transport unit, and
    wherein the controller is further configured to calculate the transport speed based upon the data read by the first detector to provide the calculated transport speed for determination as to whether the transport speed of the magnetic tape is not lower than the predetermined value when the separator is in a deactivated state, and to calculate the transport speed based upon the amount of operation of the transport unit measured by the second detector to provide the calculated transport speed for determination as to whether the transport speed of the magnetic tape is not lower than the predetermined value when the separator is in an activated state.

7. The apparatus according to claim 6, wherein the separator comprises a blower configured to blow air in a direction from the magnetic head to the magnetic tape.

8. The apparatus according to claim 6, wherein the separator comprises a mechanism configured to change a position or an angle of a guide roller which guides the magnetic tape.

9. The apparatus according to claim 6, wherein the separator comprises a mechanism configured to change a position or an angle of the magnetic head.

10. The apparatus according to claim 5, wherein the separator comprises a blower configured to blow air in a direction from the magnetic head to the magnetic tape.

11. The apparatus according to claim 5, wherein the separator comprises a mechanism configured to change a position or an angle of a guide roller which guides the magnetic tape.

12. The apparatus according to claim 5, wherein the separator comprises a mechanism configured to change a position or an angle of the magnetic head.

* * * * *